United States Patent

[11] 3,558,978

| [72] | Inventors | Dudley D. Nye, Jr.<br>Fort Lauderdale;<br>Thomas Pantelakis, Margate, Fla. |
|---|---|---|
| [21] | Appl. No. | 824,567 |
| [22] | Filed | May 14, 1969 |
| [45] | Patented | Jan. 26, 1971 |
| [73] | Assignee | Borg-Warner Corporation<br>Chicago, Ill.<br>a corporation of Delaware. by mesne assignments |

[54] ELECTRONIC CIRCUIT BREAKER WITH GRADUAL AND INSTANTANEOUS CUTOFF
10 Claims, 5 Drawing Figs.

[52] U.S. Cl. .................................................. 317/13,
 307/217, 317/33, 317/38
[51] Int. Cl. ........................................................ H02h 7/08
[50] Field of Search ........................................... 317/38, 13,
 33; 318/476; 307/217; 330/104

[56] References Cited
UNITED STATES PATENTS

| 3,165,644 | 1/1965 | Clapper ....................... | 307/217X |
| 3,243,658 | 3/1966 | Blackburn ..................... | 317/38X |
| 3,368,129 | 2/1968 | Chausse et al. ................ | 317/13X |

Primary Examiner—James D. Trammell
Assistant Examiner—Harry E. Moose, Jr.
Attorneys—Donald W. Banner, William S. McCurry, John W. Butcher and James J. Jennings, Jr.

ABSTRACT: A motor energizing circuit includes a power circuit with semiconductor switches controlled by a firing circuit. A control circuit compares an armature current signal against a reference signal to determine the extent of any overload. An inhibit signal is passed from the control circuit to disable the firing circuit immediately when the armature current signal indicates a substantial motor overload. The control circuit also allows a delay before inhibiting the firing circuit, when the armature current signal indicates an overload in the range below that level which causes instantaneous disabling of the firing circuit.

Inventors
Dudley D. Nye, Jr.
Thomas Pantelakis

By James J. Jennings, Jr.
Attorney 3,558,978

ELECTRONIC CIRCUIT BREAKER WITH GRADUAL AND INSTANTANEOUS CUTOFF

BACKGROUND OF THE INVENTION

In the motor control art various systems have been utilized to function as a circuit breaker or the equivalent when the level of armature current exceeds a preestablished level, for example, 300 percent of the rated level. There may be short circuit or an inordinate torque placed on the motor shaft to produce such a current, and under these conditions it is desired to interrupt the motor energization instantaneously. However under lesser overload conditions, for example 150 percent of rated current, the motor can be run for brief periods of a minute or so without sustaining permanent damage. For many controlled processes intermittent, short term operation is utilized and thus it would be desirable to have the same control circuit which provides instantaneous trip at substantial motor overloads also provide a delayed trip of the circuit breaker arrangement when the motor overload is not as severe. Circuits have not yet been provided to accurately produce this dual operation in an economical but positive arrangement. It is therefore a principal consideration of this invention to provide a control circuit for regulating the energization of an electric motor which instantaneously interrupts the energization of the motor when an overload is substantial, but delays this interruption for a short period of time when an overload is present but is within acceptable limits.

SUMMARY OF THE INVENTION

The present invention is useful in an energizing system for an electrical motor in which a power circuit passes electrical energy to the motor. The power circuit includes at least one semiconductor switch regulated by a firing control circuit to correspondingly regulate the energization level of the motor.

Particularly in accordance with the present invention a control circuit is provided which includes an input circuit connected to receive a first signal related to the level of current flow through the motor and to combine this signal with a reference signal to produce a resultant input signal indicating the amount by which the motor current exceeds a predetermined reference level. An amplifier circuit is connected to provide an output control signal which varies as the resultant input signal changes. A feedback circuit is coupled to this amplifier circuit to provide a proportional-plug-integral relationship between the amplifier output control signal and the resultant input signal. Circuit means is coupled to the amplifier circuit and connected to disable the firing control circuit and interrupt energization of the motor, either immediately when a sudden motor overload exceeds a preestablished level, or after a delay period when a sudden motor overload is less than the preestablished level.

THE DRAWINGS

FIG. 1 is a schematic diagram depicting a preferred embodiment of this invention coupled with conventional stages of a motor control system; and FIGS. 2—5 are graphical illustrations useful in understanding operation of the invention.

GENERAL SYSTEM DESCRIPTION

FIG. 1 depicts a motor energizing system in which a motor armature 20 receives energy from a power circuit 21 which is in turn supplied over three input conductors 22, 23 and 24. The level of energy passed through the power circuit is regulated by a firing circuit 25, which may be disabled or inhibited by a signal passed over conductor 26 to the base of an NPN type transitor 27. In the absence of an inhibit signal semiconductor switch 27 conducts and completes a circuit which enables firing circuit 25 to operate in accordance with the normal, speed control signal received over control amplifier 102.

Motor 20 is energized as DC energy passed through power circuit 21 is supplied between conductors 28, 30. When switches 31 and 32 are closed, current flows through motor 20 in a first direction and effects motor rotation in a given direction. When switches 31, 32 are opened and switches 33, 34 are closed (by control components not illustrated because they are not pertinent to this invention), current flows through motor 20 in the opposite direction and effects rotation in the opposite angular direction.

In accordance with the present invention control circuit 35 is provided and includes an operational amplifier 36. The control circuit receives a first signal over conductor 37 which indicates the level of armature current in motor 20. This signal is compared against a reference signal determined by the setting of potentiometer 38 so that the resultant input signal applied to the lower input terminal 12 of amplifier 36 signifies the extent by which the armature current exceeds a predetermined reference level. Particularly in accordance with the present invention, a first feedback circuit including a capacitor 40 and a pair of resistors 41, 42 is coupled to op amp 36. The reference signal is set and the operational amplifier circuit is connected so that under normal conditions (resultant input signal indicating armature current level is at or less than 105 percent rated current) a signal of approximately +5 volts appears at output terminal 7 of the op amp. As the motor armature current increases beyond the predetermined reference level, the input signal at connection 12 correspondingly varies and the output signal of the op amp linearly approaches a negative value at a rate which depends upon the extent of the overload, that is, the extent of the increase of the resultant input signal above the normal level. Capacitor 40 begins to charge and, after a time which is a function of the amount of overload, the output signal from op amp 36 goes slightly negative. Diode 43 then conducts and the inhibit signal is passed over conductor 26 to disable firing circuit 25 and deenergize the motor. If the armature current shows a sudden rapid increase, say to 300 percent rated current, the constants in the negative feedback circuit 40, 41 and 42 are such that the operation of control circuit 35 is virtually instantaneous and the motor is immediately deenergized.

DETAILED DESCRIPTION OF THE INVENTION

Figure 1:
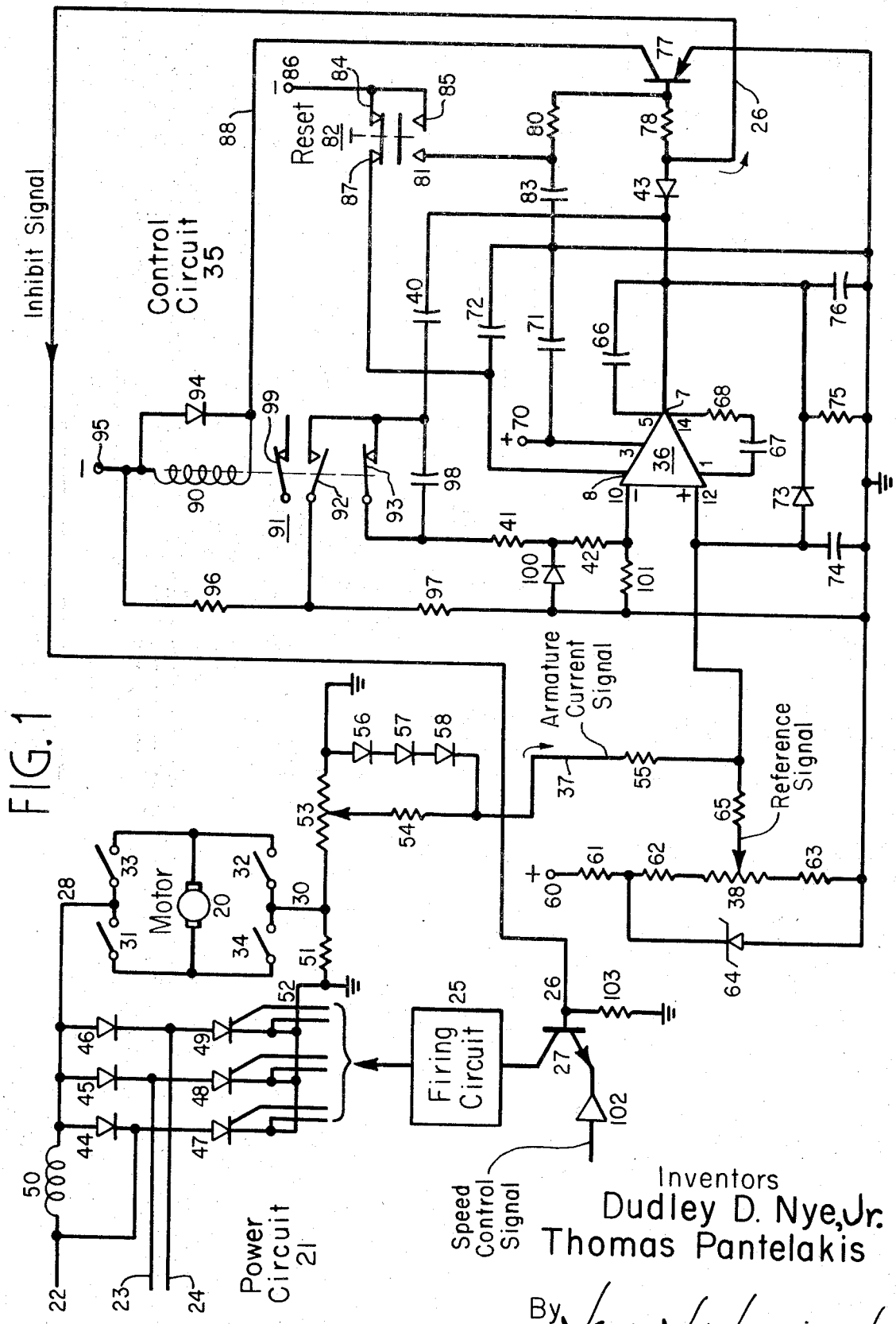
Figure 2:
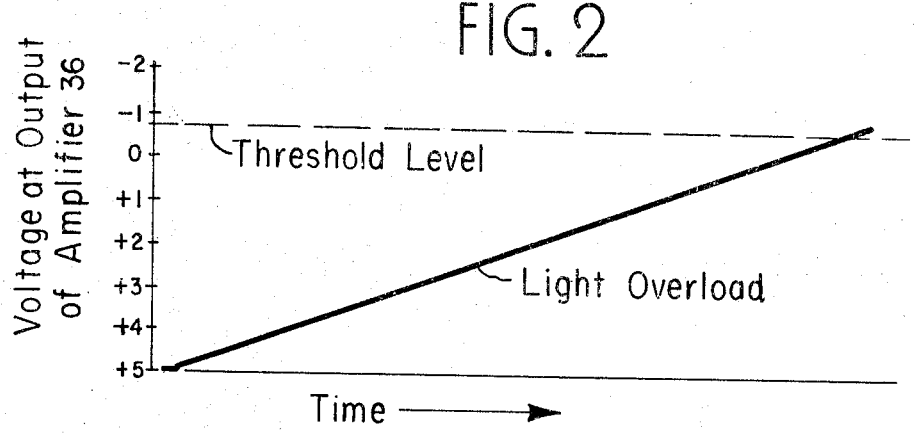
Figure 3:
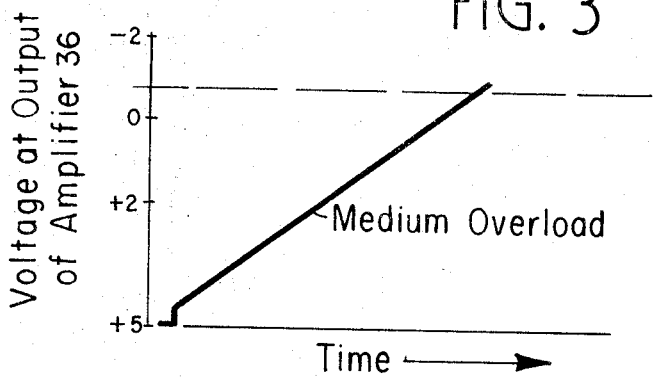
Figure 4:
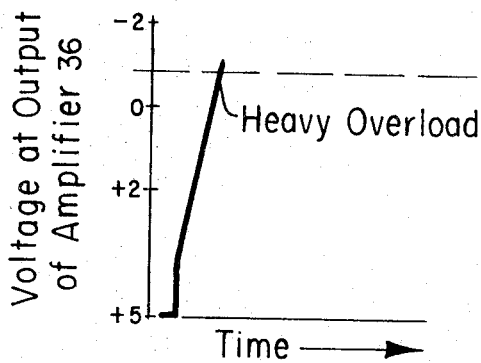
Figure 5:
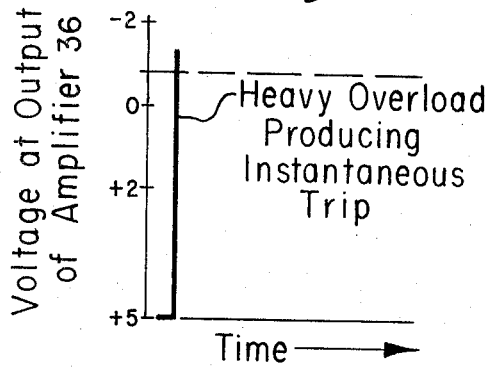

As shown in FIG. 1 three phase AC power received over conductors 22, 23 and 24 is applied to the center connections of power circuit 21, between the diodes 44, 45 and 46 and their associated semiconductor switches 47, 48 and 49. The switches 47—49 are illustrated as silicon controlled rectifiers (SCR's) but of course other components such as thyratrons, ignitrons, power transistors, transistors, electron discharge devices and so forth can be utilized.

In the illustrated embodiment the motor field winding 50 is coupled between conductors 22 and 28. Those skilled in the art will appreciate other power circuits can be employed and other types of motors can be utilized. For example DC energy can be supplied to SCR's connected in a "chopper" or DC-to-DC converter arrangement. With such an arrangement the firing circuit 25 is connected to disable the semiconductor switch or switches and interrupt transfer of the DC power responsive to the appearance of a negative-going signal on conductor 26 to interrupt current flow through transistor 27 disable firing circuit 25. The semiconductor switch 27 can be located within firing circuit 25 but is shown as a separate component to simplify this explanation.

A resistor 51 is coupled between conductors 30 and 52, and a circuit common or ground is provided at the connection between resistor 51 and conductor 52. Thus resistor 51 completes the energizing circuit between power circuit 21 and motor 20 when one pair of the switches 31—34 is closed. A potentiometer 53 is coupled between conductor 30 and ground, and a resistor 54 is coupled between the arm of this potentiometer and conductor 37 to apply the armature current signal through resistor 55 to the plus input terminal 12 of op amp 36. Three diodes 56, 57 and 58 are coupled in series between conductor 37 and ground, to protect the electronic circuits in the event excessive or short circuit currents pass through resistor 51. Accordingly the setting of potentiometer 53 affords an adjustment of the amount of signal passed over conductor 37 for a given armature current through the motor.

Control circuit 35 includes a series circuit connected between + terminal 60 and ground. This series circuit comprises resistors 61 and 62, potentiometer 38 and another resistor 63. A Zener diode 64 is coupled between ground and the connection between resistors 61, 62. This Zener diode is selected to have a zero coefficient of temperature to obviate circuit disturbances which would otherwise be occasioned by changes in the ambient temperature.

A resistor 65 is coupled between the arm or movable tap of potentiometer 38 and input connection 12 of op amp 36. An external compensation network for this op amp includes a capacitor 66 coupled between the 5 and 7 connections, and a series circuit including a capacitor 67 and a resistor 68 coupled between the 1 and 14 terminals. The 3 terminal is coupled to another + terminal 70, and is also coupled through a capacitor 71 to ground. Another capacitor 72 is coupled between the 8 connection of op amp 36 and ground.

The positive or second feedback circuit for the op amp includes a diode 73 connected as shown between terminals 12 and 7 of unit 36. A capacitor 74 is coupled between terminal 12 and ground, and a resistor 75 is coupled in parallel with another capacitor 76 between the output side of op amp 36 and ground.

In the overload trip or portion of circuit 35 is a PNP-type transistor 77, the emitter of which is grounded. The base of transistor 77 is coupled to two resistors 78 and 80. The other side of resistor 78 is coupled to inhibit conductor 26 and to the anode of diode 43. The other side of resistor 80 is coupled to a first contact 81 of reset switch 82, and is also coupled to one side of a capacitor 83, the other side of which is grounded. The two right-hand contacts 84, 85 of reset switch 82 are coupled together and to a negative energizing terminal 86. Remaining contact 87 of the reset switch is coupled to the 8 terminal of op amp 36 and to one plate of capacitor 72.

The collector of overload transistor 77 is coupled over conductor 88 to one side of winding 90 of overload relay 91, which also includes a normally open contact set 92, a first normally closed contact set 93, and an additional normally closed contact set 99. A protective diode 94 is coupled in parallel with winding 90 between conductor 88 and another negative terminal 95. Resistors 96, 97 are coupled in series between terminal 95 and ground. The movable contact of the set 92 is coupled to the common connection between resistors 96, 97. The movable contact of the set 93 is coupled to the common connection between resistor 41 and a capacitor 98. The fixed contacts of both sets 92, 93 are coupled together and to the common connection between capacitors 40 and 98. A diode 100 is coupled between ground and the common connection between resistors 41 and 42, and a resistor 101 is coupled between ground and the 10 or negative input connection of op amp 36.

In operation AC energy is supplied over conductors 22, 23 and 24 and conduction of the SCR's in power circuit 21 is regulated by signals from firing circuit 25 to correspondingly regulate the energization of motor 20. With DC energy applied between conductors 28, 30 either switches 31, 32 are closed to provide rotation in one direction, or switches 33, 34 are closed to provide motor shaft rotation in the opposite direction. Under these conditions, with no overload an inhibit signal is not passed over conductor 26 to open the circuit through switch 27 and disable firing circuit 25.

In control circuit 35, the setting of potentiometer 38 is adjusted so that op amp 36 is normally in a positive saturation state with approximately +5 volts at its output terminal 7, when the level of the first signal received over conductor 37 signifies that the actual armature current of motor 20 is at or below 105 percent of rated current. At this time transistor 77 is nonconductive.

Assuming that the level of armature current goes to 150 percent of the rated level, or 150 percent load, this is signalled by a corresponding change in the level of the armature current signal passed over conductor 37 to change the resultant input signal at terminal 12 of op amp 36. This begins to change the output control signal from the op amp in the negative direction, reducing the output voltage from its positive saturation level toward zero. It is emphasized that the negative feedback circuit including capacitor 40, normally closed contact set 93, and resistors 41, 42 provides a proportional-plus-integral function in this circuit. That is, an initial step change at terminal 12 is rapidly translated as a step function through the negative feedback circuit just identified to provide an equal step change at the other input terminal 10, as well as a step change in the output signal at terminal 7. Thereafter, if the overload of approximately 150 percent rated load is maintained, capacitor 40 charges to provide the integrating function over a time period determined by the values of the circuit components 40, 41 and 42. However if the initial step change in the armature current signal is substantial, corresponding to an overload of approximately 300 percent rated load in the illustrated embodiment, the initial step signal translated through the negative feedback circuit is sufficient to cause diode 100 to begin conduction. This removes the negative feedback and drives the output signal from op amp 36 from the +5 volt level to a negative value, to actuate the overload trip circuit. The proportional-plus-integral operation of the op amp circuit thus protects the motor by providing instantaneous deenergization when the overload is substantial, while simultaneously allowing a short time period (which decreases as the overload increases) before the overload circuit is tripped for lesser amounts of overload. The decrease in time required to trip the overload circuit, as the extent of the overload increases, is depicted in FIGS. 2—5.

With a moderate overload the output signal at terminal 7, after a time delay, goes slightly negative, and diode 73 begins to conduct, producing an additional negative-going signal at terminal 12 to cause the output of 36 to move quickly into the negative region. This causes conduction through diode 43 and the base-emitter junction of transistor 27, thus disabling firing circuit 25. When the output of op amp 36 quickly moves into the negative region, due to the positive feedback path via diode 73, diode 100 conducts and disables the negative feedback signal path via capacitor 40. This insures that with just a slight transition from the positive to the negative polarity signal from op amp 36, the switching action becomes very rapid and positive, and there is no "jittering" or oscillating around a control point. Amplifier 36 locks up with full negative output.

As the output signal from amplifier 36 goes negative and diode 43 begins to conduct, a forward bias is provided in the base-emitter circuit of transistor 77, which also conducts and completes a path for current flow through winding 90. Relay 91 operates and at its contact set 92 completes a path which passes the voltage between resistors 96, 97 to the junction between capacitors 98, 40. The values of resistors 96, 97 are selected so that this switching action rapidly removes the accumulated charge from capacitor 40 and restores it to the initial circuit condition, preparatory to instant response in another cycle of operation after the system is reset. In its operation relay 91 also opens contact set 93 so that the voltage at the top of resistor 41 does not affect the reset of capacitor 40. Relay 91 in its operation also opens the additional contact set 99, which is connected (over conventional circuits not illustrated) to interrupt the power circuit between SCR's 47—49 and motor 20. This is effected by dropping out the contactor contacts 31, 32 or 33, 34. The normal energizing time of relay 91 delays interruption of the power circuit until a time after diode 43 conducts and firing circuit 25 is disabled, insuring that the contactor contacts do not break the fault or overload current. A start button (not shown) in the contactor circuit must then be pushed to restore operation, in addition to resetting control circuit 35.

As already noted the charge on capacitor 40 is rapidly restored to initial conditions as contact set 92 closes. To unlock amplifier 36 and complete restoration of the circuit, reset switch 82 is depressed to interrupt the connection between contacts 84 and 87, breaking the connection between negative terminal 86 and connection 8 of the op amp 36. Reset switch 82 may include a conventional spring return arrangement. To prevent inadvertent restoration of power to the motor before the reset button has been released, when the reset switch is actuated a circuit is completed between the other contact set 81, 85 such that the negative potential at point 86 is passed over resistor 80 to the base of transistor 77, maintaining this transistor conducting to keep relay 91 operated at this time, holding contact set 99 open. This prevents closure of contacts 31, 32 or 33, 34, thus obviating the restoration of motor operation before the reset button has been released.

Capacitors 71 and 72 are sized electrically relative to each other so that the circuit including op amp 36 when initially energized will come on in the positively saturated state, with the desired positive voltage level at the output terminal 7 of the op amp. Capacitors 74 and 76 are selected of appropriate value to obviate erroneous triggering of the op amp circuit by reason of transients and RF signals. This produces a slight delay, less than a millisecond, in the instantaneous trip action of the circuit. However with semiconductor switches of the SCR type, after such a switch is gated on by the appropriate signal from the firing circuit, the gate signal loses control and conduction is maintained so long as the voltage maintained between the anode and cathode is of the appropriate polarity. Thus the SCR is not extinguished until the next polarity reversal of the energizing voltage applied over conductors 22—24, and the negligible delay produced by the transient suppression arrangement does not detract from the virtually instantaneous operation of the circuit. Capacitor 83 prevents stray pickup from affecting transistor 77 when reset switch 82 is externally mounted.

Those skilled in the art will appreciate that various changes may be made in the preferred embodiment described above. For example the transistors 77 and 27 can be replaced by semiconductors of the opposite type (NPN for PNP and vice versa), with the concomitant reversal of the energizing potentials and control signals. The described embodiment is given to assist those skilled in the art to practice the invention, and to this end a list of suitable circuit components and values for the arrangement of control circuit 35 will be set out below. It is understood that such table is by way of illustration only and in no sense by way of limitation on the present invention.

For the illustrated circuit operational amplifier 36 was an integrated circuit unit identified as PA238 (GE). Control circuit 35 was energized with +16 volts applied to terminal 60 and −16 volts applied to terminal 95. A +6 volt potential was applied at terminal 70, and a −6 volt potential at terminal 86. The other components are:

| Component: | Identification or Value |
|---|---|
| 77 | 2N3638 |
| 64 | 1N936 |
| 43, 73, 94, 100 | 1N5059 |
| 38 | ohms....100, 20% |
| 41 | do....2.94K, 1% |
| 42 | do....9.76K, 1% |
| 55, 65 | do....15K, 1% |
| 61 | do....825, 1% |
| 62 | do....8.87K, 1% |
| 63 | do....150, 1% |
| 68 | do....150, 1% |
| 75, 97 | do....[1] 10K, 10% |
| 78, 80, 96 | do....[1] 6.8K, 10% |
| 101 | do....7.5K, 1% |
| 40 | microfarads....60, 5% |
| 66 | picofarads....47, 10% |
| 67, 74 | microfarad....0.033, 10% |
| 71 | do....0.1, 10% |
| 72 | do....[2] 67% |
| 76, 83 | do....0.47, 10% |
| 98 | do....0.047, 10% |

[1] 1/2 watt.
[2] −10% to +50%.

While only a particular embodiment of the invention has been shown and described, it will be apparent to those skilled in the art that various changes and modifications may be made therein without departing from the invention in its broader aspects. Therefore the aim in the appended claims is to cover all such changes and modifications as may fall within the true spirit and scope of the invention.

We claim:

1. An energizing system for an electrical motor in which electrical energy is passed to the motor through a power circuit including at least one semiconductor switch regulated by a firing circuit, comprising a control circuit which includes an input circuit connected to receive a first signal related to the level of current flow through the motor and to combine said first signal with a reference signal to produce a resultant input signal indicating the amount by which the motor current exceeds a predetermined reference level, an amplifier circuit in said control circuit connected to provide an output control signal which varies as said resultant input signal changes, a first feedback circuit coupled to said amplifier circuit to provide proportional-plus-integral operation in the response of said output control signal to a given change of said resultant signal, and means coupled to said amplifier circuit and connected to disable the firing control circuit and interrupt energization of the motor, either immediately responsive to a sudden motor overload exceeding a preestablished level, or after a delay period responsive to a sudden motor overload less than said preestablished level.

2. An energizing system as claimed in claim 1 in which said first feedback circuit comprises a capacitor coupled in series with at least one resistor, such that the proportional operation is obtained by translation of a step signal through said capacitor and the integral operation is obtained as said capacitor charges subsequent to passage of the step signal.

3. An energizing system as claimed in claim 1 in which said first feedback circuit is a negative feedback circuit for gradually changing the output control signal from a positive level toward a negative level, and a second feedback circuit is provided and coupled to said amplifier circuit such that said second feedback circuit provides positive feedback after said output control signal goes negative.

4. An energizing system as claimed in claim 1 in which said means for disabling the firing control circuit comprises a diode coupled to the output side of said amplifier circuit to conduct when said output control signal goes negative, and a semiconductor switch coupled to said firing circuit for regulation by an inhibit signal provided when said diode conducts to disable the firing circuit.

5. An energizing system for an electrical motor in which electrical energy is passed to the motor through a power circuit including at least one semiconductor switch regulated by a firing circuit, comprising a control circuit including an operational amplifier having first and second input connections and an output connection, an input circuit connected to receive a first signal related to the level of current flow through the motor and to combine said first signal with a reference signal to produce a resultant input signal indicating the amount by which the motor current exceeds a predetermined reference level, means for applying said resultant input signal to the first input connection of the operational amplifier to provide an output control signal at said output connection which varies as a function of said resultant input signal, a first feedback circuit including a capacitor and a resistor coupled between said output connection and said second input connection of the operational amplifier to provide proportional-plus-integral operation in the response of said output control signal to a given change of said resultant input signal, and means, including a first diode, coupled between said output connection of the operational amplifier and said firing circuit, for disabling the firing circuit and interrupting energization of the motor responsive to a change in state of conduction of said first diode, which change in state occurs either immediately responsive to a sudden motor overload as signified by said resultant input signal exceeding a preestablished level, or occurs after a time delay period during which said capacitor is first charged responsive to a sudden motor overload signified by a change in said resultant input signal to a level less than said preestablished level.

6. An energizing system as claimed in claim 5 in which the output control signal of the operational amplifier is normally positive when said resultant input signal indicates the motor current is less than said predetermined reference level, in which said first feedback circuit provides negative feedback to gradually modify the output control signal toward a polarity reversal and effect conduction of said first diode, and a positive feedback circuit including a second diode coupled between said output connection and said first input connection of the operational amplifier, which second diode also conducts as said output control signal goes negative and thus provides positive feedback to reinforce the switching action of the control circuit including the operational amplifier.

7. An energizing system as claimed in claim 6 and further comprising a third diode, coupled between ground and a connection of said first feedback circuit, such that said third diode conducts as said output control signal goes negative and the switching action occurs, for effectively disabling said first feedback circuit as the switching of the control circuit occurs.

8. An energizing system as claimed in claim 5 and further comprising a relay having a winding and at least one contact set, means including a semiconductor switch for completing a path for current flow through the relay winding after said first diode conducts to disable the firing circuit, and circuit means, including said contact set, coupled to said capacitor in the first feedback circuit for rapidly returning the charge on said capacitor to its initial condition and thus preparing the first feedback circuit for immediate proportional-plus-integral operation as the control circuit is reset.

9. An energizing system as claimed in claim 8 in which said relay includes an additional contact set connected to interrupt the power circuit between said one semiconductor switch and the motor responsive to energization of the relay, such that the normal energizing time of the relay delays interruption of the power circuit by said additional contact set until a time after the first diode has conducted and disabled the firing circuit.

10. An energizing system for DC electrical motor in which a power circuit includes at least one semiconductor switch regulated by a firing circuit to rectify received AC energy and provide DC energy for the motor, comprising a control circuit including an operational amplifier having first and second input connections and an output connection, an input circuit connected to receive a first signal related to the level of current flow through the motor and to provide an adjustable reference signal, means for combining said first signal and said reference signal to produce a resultant input signal indicating the amount by which the motor current exceeds a predetermined reference level, means for applying said resultant input signal to the first input connection of the operational amplifier to provide an output control signal at said output connection which is normally positive and varies in a negative-going sense as said resultant input signal increases, a negative feedback circuit including a capacitor and a resistor coupled between said output connection and said second input connection of the operational amplifier to provide a proportional-plus-integral change of said output control signal for a given step change of said resultant input signal, means, including a first diode, coupled between said output connection of the operational amplifier and said firing circuit, for disabling the firing circuit and interrupting energization of the motor responsive to a polarity change as the output control circuit goes negative and the first diode begins to conduct, which polarity change occurs virtually instantaneously responsive to a sudden motor overload as signified by a large step change in said resultant input signal exceeding a preestablished level which is passed through said capacitor to produce the switching action without capacitor charging, or which polarity change occurs after a time delay period by reason of a smaller motor overload producing a smaller step change in the resultant input signal which is passed through said capacitor and then augmented as the capacitor is charged to the level which provides the switching action, and a positive feedback circuit, including a second diode coupled between the output connection and first input connection of the operational amplifier, which conducts responsive to said polarity change to enhance the rapid switching action of the control circuit.